US009829361B2

(12) United States Patent
Chen

(10) Patent No.: US 9,829,361 B2
(45) Date of Patent: Nov. 28, 2017

(54) METHOD FOR ACCURATELY MEASURING GAS FLOW AND LIQUID FLOW IN A GAS AND LIQUID MIXED FLUID

(71) Applicant: Lanzhou Haimo Technologies, Co. Ltd., Gansu (CN)

(72) Inventor: Jige Chen, Gansu (CN)

(73) Assignee: HAIMO TECHNOLOGIES GROUP CORP., Lanzhou, Gansu (CN)

( * ) Notice: Subject to any disclaimer, the term of this patent is extended or adjusted under 35 U.S.C. 154(b) by 336 days.

(21) Appl. No.: 14/416,263

(22) PCT Filed: Jul. 22, 2013

(86) PCT No.: PCT/CN2013/079758
§ 371 (c)(1),
(2) Date: Jan. 21, 2015

(87) PCT Pub. No.: WO2014/015770
PCT Pub. Date: Jan. 30, 2014

(65) Prior Publication Data
US 2015/0204706 A1    Jul. 23, 2015

(30) Foreign Application Priority Data

Jul. 24, 2012 (CN) .......................... 2012 1 0257867

(51) Int. Cl.
*G01F 1/74* (2006.01)
*G01F 1/44* (2006.01)
*G01F 5/00* (2006.01)

(52) U.S. Cl.
CPC ................. *G01F 1/74* (2013.01); *G01F 1/44* (2013.01); *G01F 5/00* (2013.01)

(58) Field of Classification Search
CPC ................. G01F 5/00; G01F 1/74; G01F 1/44
See application file for complete search history.

(56) References Cited

U.S. PATENT DOCUMENTS 3,960,175 A * 6/1976 Liepe .................... B01F 5/0068
137/889
5,591,922 A * 1/1997 Segeral .................... G01F 1/36
73/861.04

(Continued)

FOREIGN PATENT DOCUMENTS

CN          102749104 B          9/2014

OTHER PUBLICATIONS

Unknown, "An Introduction to Wet-Gas Flow Metering", no date, National Measurem System, pp. 1-28.*

(Continued)

*Primary Examiner* — Mischita Henson
(74) *Attorney, Agent, or Firm* — Morgan, Lewis & Bockius LLP; Jeffry S. Mann

(57) ABSTRACT

A flow metering method for an annular gas and liquid flow comprises the following steps of: first, enabling a gas and liquid mixed fluid to flow through a vertically arranged circular pipe so as to form the annular gas and liquid flow; and then measuring total flow or liquid average velocity or gas average velocity of the gas and liquid mixed fluid; measuring physical quantities, such as temperature, pressure, gas fraction and the like, of the gas and liquid mixed fluid; and finally, accurately figuring out liquid volume flow and gas volume flow according to analysis of a gas and liquid slip factor.

7 Claims, 6 Drawing Sheets

(56) References Cited

U.S. PATENT DOCUMENTS

2006/0236779 A1* 10/2006 Atkinson ................. G01F 1/44
73/861.03
2015/0204706 A1    7/2015 Chen

OTHER PUBLICATIONS

Li et al., "Accurate Measurement of Steam Flow Properties", Oct. 17-20, 1999, GRC Annual Meeting, pp. 1-10.*
Unknown, "Flow of Multiphase Mixtures", no date, Chapter 5, pp. 181-189.*
Davis, M.R., "Structure and Analysis of Gas-Liquid Mixture Flow", Aug. 18-22, 1980, $7^{th}$ Australasian Hydraulics and Fluid Mechanics Conference, pp. 416-419.*
Velmurugan et al., "Ultrasonic Flowmeter using CrossCorrelation Technique", Mar. 2013, International Journal of Computer Applications, vol. 66, No. 10, pp. 19-22.*

* cited by examiner

METHOD FOR ACCURATELY MEASURING GAS FLOW AND LIQUID FLOW IN A GAS AND LIQUID MIXED FLUID

CROSS-REFERENCE TO RELATED APPLICATIONS

This application is a 371 of PCT/CN2013/079758 filed Jul. 22, 2013 which claims benefit of CN 201210257867.6 filed on Jul. 24, 2012, both of which are incorporated herein by reference in their entireties.

FIELD OF THE INVENTION

The invention is in the field of the measurement of fluid flow rate, particularly, to relate a method for measuring gas flow rate and liquid flow rate in a gas-liquid mixed fluid.

BACKGROUND OF THE INVENTION

In the oil-exploring industry, gas-liquid mixed fluids comprising liquid phase and gas phase are usually explored from oil wells, and the fluids are customarily called as "wet gas" in the art. Said gas phase includes, for example, air, oil field gas or any gases which are non-condensable at room temperature, wherein the oil field gas is generally selected from relatively light alkanes, such as methane, ethane, propane, butane and the like. Said liquid phase includes crude oil per se, and water and other liquid additives which are injected to oil wells during the exploration. The liquid volume flow rate and the gas volume flow rate of the gas-liquid mixed fluids explored in oil wells, which are real-time and accurately measured, are necessary basic data for the production management and production optimization.

Currently, there are some methods which can achieve the on-line measurement of gas volume flow rate and liquid volume flow rate of a gas-liquid mixed fluid.

In conventional methods, a gas-liquid mixed fluid is separated into a gas phase and a liquid phase via a separator, and then the volume flow rate of the two phases can be respectively metered. However, because the separator and relevant instillations affiliated thereto weigh to be decadal tons, occupy a space having an area of hundreds square meters, and have many controlling steps, maintenances and managements for the separator are complex, which is disadvantageous to automation of the management to production procedure, in particular, disadvantageous to the use in oil fields in desert or ocean.

In another kind of methods, gas and liquid phases are not separated, while the total volume flow rate Q and gas volume fraction GVF of a gas-liquid mixed fluid are measured so as to measure gas volume flow rate and liquid volume flow. The gas volume fraction GVF refers to the percentage of the gas flow rate in the total flow rate of the gas-liquid mixed fluid, and it also can refer to the ratio of the area occupied by the gas phase to the whole cross-section area at a certain cross-section. The calculation method under theoretical circumstance comprises the following equations: the gas volume flow rate $Qg=Q\times GVF$, and the liquid volume flow rate $Ql=Q\times(1-GVF)$. However, such measuring methods should be based on the proviso that the gas and liquid phases should have the same speed at the cross-section.

However, in fact, because gas phase and liquid phase are different from each other markedly in the density, viscosity and other properties, the above proviso is not tenable in actual pipeline. In actual pipeline, because gas phase has a relatively low density, the velocity of gas phase is often higher than that of liquid phase, which results in that the above gas and liquid volume flow rate measured under theoretical circumstance will involve some errors. Hence, there is a need for an improved method to correct the above theoretical circumstance. In the art, the difference between the gas velocity and the liquid velocity of the gas-liquid mixed fluid in a same pipeline can be referred to "gas-liquid slip", and the ratio of the gas velocity to the liquid velocity of the gas-liquid mixed fluid in a same pipeline can be referred to "gas-liquid slip factor". Detailed introductions to the gas-liquid slip and the gas-liquid slip factor will be made in the following text.

In current measuring techniques for a gas-liquid mixed fluid, there are two methods to correct the errors caused by the gas-liquid slip:

One method relates to the iterative calculation based on the Lockhart-Martinelli parameters of gas phase and liquid phase, principally used in the correction for overly high flow rate in the measurement of the wet gas containing a very high percentage of gas. Typical representation is the ISO wet gas model (for example, please see the publication ISO/TR 11583:2012, with the English title "measurement of wet gas flow by means of pressure differential devices inserted in circular cross-section conduits"). Such method uses a single phase meter to measure wet gas as a single phase, and multiphase meters will not be used. Hence, liquid flow rate value or an approximating value thereof should be acquired beforehand via other routes, and thus the correction is the correction directed to the gas flow. Such method has three defects: 1. there are no explicit dynamic mechanism; 2. only the gas flow rate is corrected, and no corrections to the metering of the liquid flow rate are made; and 3. the applicable scope is narrow because the method is limited to wet gas containing a very high percentage of gas.

Another method relates to the correction to the gas-liquid slip of the two phase flow based on an empirical model, for example, experimental data fitting mode, or sign treatment model. Such method has two defects: the dependence of the empirical model on experimental data and measuring conditions is strong, and thus the method cannot achieve the balance of the universality and the precision; in addition, due to the complexity of the flow state of a multiphase fluid, it is very difficult for the empirical model to make selections to the modeling parameters and make more reasonable hypothesis to the mathematical relation of the parameters. In the signal processing, multiphase fluids are treated completely as a black box, and thus the calculation precision and scope have significant artificial features and uncertainty.

Hence, there is a need in the art for a method which can simply and precisely measure gas volume flow rate and liquid volume flow rate of a gas-liquid mixed fluid, and which can correct the measurement errors caused by the gas-liquid slip.

Figure 1:
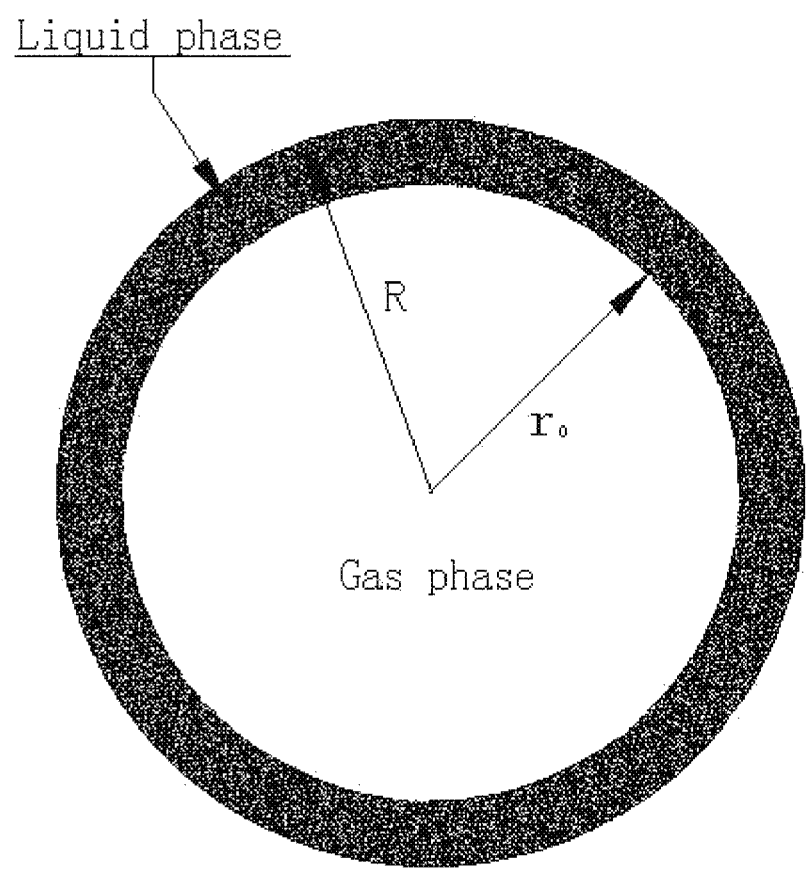
FIG. 1 is a scheme for the section after the gas-liquid mixed fluid is formed into an annular flow in the vertical pipe, in which the white portion in the center is the gas phase, and the annular shading portion is the liquid phase.
Figure 2:
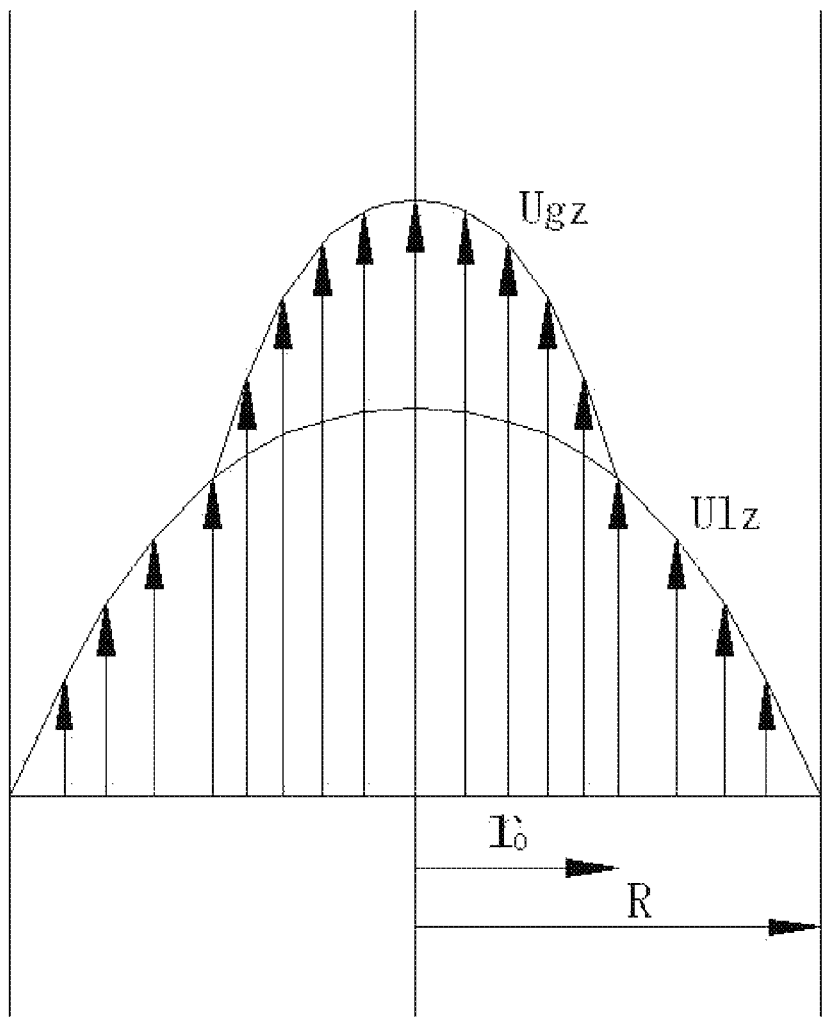
FIG. 2 is a scheme for the distributions of the gas velocity and the liquid velocity along the radial direction after the gas-liquid mixed fluid is formed into an annular flow in the vertical pipe.
Figure 3:
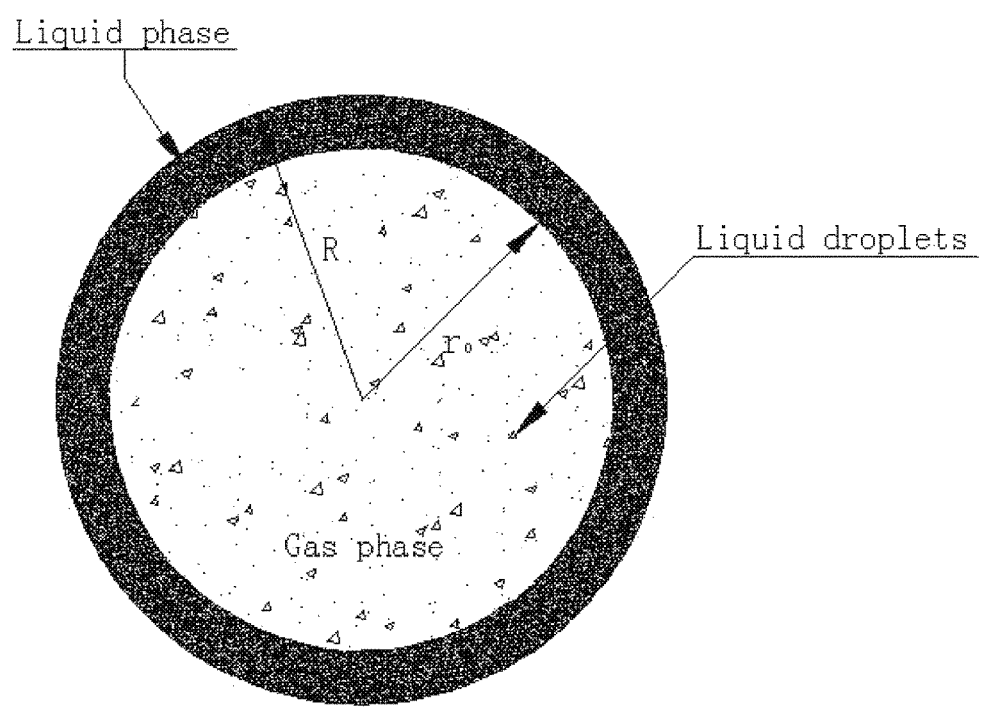
FIG. 3 is a scheme for the section after the gas-liquid mixed fluid is formed into an annular mist flow, in which the white portion in the center is the mist consisting of the gas phase and liquid droplets dispersed therein, and the annular shading portion is the liquid phase.

The above drawings are provided merely for illustrations, and they are not intended to limit the present invention in any manner. The protection scope of the invention is determined only by the claims.

SUMMARY OF THE INVENTION

A first aspect of the invention relates to a method for precisely measuring the gas volume flow rate and liquid volume flow rate in a gas-liquid mixed fluid, comprising the following steps:

(a) letting the gas-liquid mixed fluid to flow through a vertically arranged circular pipe so as to form a gas-liquid two-phases annular flow; the gas-liquid two-phase annular flow referring to such a flow mode that the gas surrounds the axis of the circular pipe in a column form, while the liquid is distributed between the gas and the pipe wall in a ring form;

(b) measuring the total volume flow rate Q, temperature T, pressure P and gas volume fraction GVF of the gas-liquid mixed fluid;

(c) calculating the gas-liquid slip factor S and the gas volume flow rate Qg and the liquid volume flow rate Ql based on the following equations:

$$S=2-GVF/(\mu k \times (GVF-1))$$

$$Qg=Q \times GVF \times S/(1-GVF+S^*GVF)$$

$$Ql=Q \times (1-GVF)/(1-GVF+S^*GVF)$$

wherein, Q denotes the total volume flow rate, the unit being m$^3$/s; S denotes the ratio of the gas velocity (in m/s) to the liquid velocity (in m/s), dimensionless; GVF denotes the gas volume fraction, dimensionless; $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless.

A second aspect of the invention relates to method for precisely measuring the gas volume flow rate and liquid volume flow rate in a gas-liquid mixed fluid, comprising the following steps:

(a) letting the gas-liquid mixed fluid to flow through a vertically arranged circular pipe so as to form a gas-liquid two-phases annular flow; the gas-liquid two-phase annular flow referring to such a flow mode: the gas surrounds the axis of the circular pipe in a column form, while the liquid is distributed between the gas and the pipe wall in a ring form;

(b) measuring the liquid average velocity Vl, temperature T, pressure P and gas volume fraction GVF of the gas-liquid mixed fluid;

(c) calculating the gas-liquid slip factor S and the gas volume flow rate Qg and the liquid volume flow rate Ql based on the following equations:

$$S=2-GVF/(\mu k \times (GVF-1))$$

$$Qg=Vl \times A \times GVF \times S$$

$$Ql=Vl \times A \times (1-GVF)$$

wherein, V$_l$ denotes the liquid average velocity, the unit being m/s; S denotes the ratio of the gas velocity (in m/s) to the liquid velocity (in m/s), dimensionless; GVF denotes the gas volume fraction, dimensionless; μk denotes the ratio of the gas viscosity μg (in any viscosity unit, e.g., Pa·s) to the liquid viscosity μl (in any viscosity unit, e.g., Pa·s) at the measuring temperature T and pressure P of the gas-liquid mixed fluid, dimensionless; A denotes the cross-sectional area of the circular pipe, the unit being m$^2$.

A third aspect of the invention relates to a method for precisely measuring the gas volume flow rate and liquid volume flow rate in a gas-liquid mixed fluid, comprising the following steps:

(a) letting the gas-liquid mixed fluid to flow through a vertically arranged circular pipe so as to form a gas-liquid two-phases annular flow; the gas-liquid two-phase annular flow referring to such a flow mode that the gas surrounds the axis of the circular pipe in a column form, while the liquid is distributed between the gas and the pipe wall in a ring form;

(b) measuring the gas average velocity V$_g$, temperature T, pressure P and gas volume fraction GVF of the gas-liquid mixed fluid;

(c) calculating the gas-liquid slip factor S and the gas volume flow rate Qg and the liquid volume flow rate Ql based on the following equations:

$$S=2-GVF/(\mu k \times (GVF-1))$$

$$Qg=Vg \times A \times GVF$$

$$Ql=Vg \times A \times (1-GVF)/S$$

wherein, Vg denotes the gas average velocity, the unit being m/s; S denotes the ratio of the gas velocity (in m/s) to the liquid velocity (in m/s), dimensionless; GVF denotes the gas volume fraction, dimensionless; $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless; A denotes the cross-sectional area of the circular pipe, the unit being m$^2$.

DETAILED DESCRIPTION OF THE INVENTION

The terms used in the invention are defined as follows:

The term "gas-liquid mixed fluid" refers to a gas and liquid mixture in motion, wherein the gas phase and the liquid phase may be mixed in any form. For example, the gas and liquid phases have a continuous boundary to form so-called "stratified flow"; alternatively, the liquid phase may be suspended in the gas, to form so-called "liquid droplet flow"; alternatively, the gas phase is suspended in the liquid phase, to form so-called "bubble flow"; alternatively, a certain segment of the pipeline contains gas, and another segment contains liquid, to form so-called "plug flow".

The term "flow rate" refers to the volume of a fluid which flows through a certain section in unit time. The flow rate has many kinds of calculation methods, and the methods can be classified into the instantaneous flow rate and the integral flow rate according to the time, where the instantaneous flow rate refers to the flow rate at a time, i.e., a time point, and the integral flow rate refers to the flow rate during a period, and the integral flow rate can be understood to be an integral value of the instantaneous flow rate within a time period. The integral flow rate is important to the industry production, hence, in the invention, unless it is otherwise illustrated, the mentioned "flow rate" refers to an integral flow rate.

The term "velocity" also can be called as "flow velocity", and it refers to the distance through which a fluid flows in unit time. The term "velocity" should be a vector in the physics and in the hydromechanics. However, in the invention, it is deemed as a scalar, that is, the directions of the velocity of all fluids in a pipeline are parallel to the axis of the pipeline and toward the direction along which the fluids go forward, and thus the magnitude of the velocity is taken into regard, while its direction is neglected. The hypothesis complied with actual needs of oil-exploring industry, and because, in general, we merely are interested in the magnitude of the velocity, but not interested in its direction. The "velocity" further can be classified into the velocity at a point of the section of the fluid and the average velocity of the whole section, the former being called as the point velocity, and in general, the latter being abbreviated to the section average velocity. Conceptually, the section average velocity is the area integration of the point velocity on the section. When the invention uses the concept "velocity", unless it is specifically illustrated that the velocity is a point velocity, the velocity refers to the section average velocity. In a multiphase fluid, the velocity of a certain phase usually refers to the average velocity of the phase at its section, and the velocity ratio in the current patent also refers to the ratio of the "average velocity" of individual phases.

The term "gas-liquid slip" refers to the difference between gas velocity and liquid velocity of a gas-liquid mixed fluid in a same pipeline. The term "gas-liquid slip factor" refers to the gas velocity to liquid velocity ratio of the gas-liquid mixed fluid in a same pipeline, dimensionless.

The term "phase fraction" refers to, at a certain flowing cross-section of a multiphase fluid (when the fluid flows through a pipe, it is the cross-section of the pipe), the ratio of the area occupied by this certain phase to the whole flowing cross-section area. According to different phases, the term can be classified into "gas volume fraction" (abbreviated as GVF, and also called as the section gas content) and "liquid volume fraction" (also called as the section liquid content), which respectively refer to the ratios of the areas occupied by gas phase and liquid phase at a certain flowing cross-section to the whole flowing cross-section area. The phase fraction may be measured by a phase fraction meter.

The term "stable-state flow" refers to that the flowing pattern of a fluid is not changed with time in macroscopic view, that is, the fluid reaches a so-called "stable state".

In the step a of the first aspect according to the invention, the gas-liquid mixed fluid flows through a vertical circular pipe to form a gas-liquid two-phases annular flow; said gas-liquid two-phase annular flow refers to such a flow mode: the gas surrounds the axis of the circular pipe in a column form, while the liquid is distributed between the gas and the pipe wall in a ring form. As generally considered, when the gas-liquid mixed fluid flows in a horizontal or declining pipeline, because the density of the liquid phase is greater than the density of the gas phase, the liquid phase is mainly distributed at the middle and lower portions of the pipeline, which makes it difficult to meter the volume flow rate of the gas and liquid phases and correct the errors caused by the gas-liquid slip. In order to avoid the situation, the present invention lets the gas-liquid mixed fluid to flow through a circular pipe which is vertically arranged, to form a flow mode wherein the gas flow at the pipe center, and the liquid flows between the pipe wall and the gas. In the invention, the flow mode is called as the gas-liquid two-phase annular flow. The measuring advantage of such gas-liquid two-phase annular flow resides in that in the stable state, the gas and liquid velocity fields are symmetrically distributed around the axis of the circular pipeline, and the advantage can benefit the correction of the gas-liquid slip. The inventors, by a large quantity of tests, finds out that such gas-liquid two-phase annular flow can be realized stably and reproducibly in the vertical circular pipe by controlling the following condition: the gas superficial velocity ≥15 m/s, wherein the gas superficial velocity can be generally measured by other conventional measurements, for example, after the gas phase and the liquid phase are separated, the volume flow rate of the gas phase is measured, and the resultant value is divided by the cross-section area of the pipeline to give the gas superficial velocity.

In the step b of the first aspect according to the invention, the total volume flow rate Q, temperature T, pressure P and gas volume fraction GVF of the gas-liquid mixed fluid are measured. Therein, the gas volume fraction GVF is online measured by a phase fraction meter which is selected from a single-energy gamma ray phase fraction meter and dual-energy gamma ray phase fraction meter. These phase fraction meters are commercially available products, and a person skilled in the art will know how to buy them and use them, so that no details are discussed. As generally considered, the measured gas volume fraction GVF refers to the ratio of the area occupied by the gas at a certain section to the total section area. In the case of the annular flow according to the invention, the gas volume fraction $GVF=r_0^2/R^2$, where $r_0$ denotes the radius of the gas column as shown in FIG. 1, and R is the internal radius of the circular pipe. The temperature T can be obtained by any conventional temperature measurements, for example, by a thermocouple or a temperature meter. The pressure P may be measured by any conventional pressure measuring devices, e.g., by a pressure sensor or a pressure meter. The total volume flow rate Q may be measured by using any conventional volume flow rate measurements, e.g., a venturi flow meter, an orifice flow meter, or a rotameter. These devices and methods are well known and are commercially available. In particular, in one embodiment of the aspect, a venturi flow meter is used to measure the total volume flow rate. The venturi flow meter may be installed in any position of the pipeline, and however, it is preferred that it is installed in a certain segment of the vertical circular pipe, most preferably, at a position in the middle of the vertical circular pipe which is away from both the inlet and outlet of the vertical circular pipe in a certain distance, for example, a distance greater than six times of the diameter of the circular pipe, so that measured flow rate is relatively accurate. In general, the venturi flow meter is equipped with a differential pressure transmitter to measure the pressure differences at the inlet and the throat of the flow meter, and the pressure differences can be used to calculate the total volume flow rate Q. A specific calculation equation can be found in any hydromechanics textbook or any specification for using such flow meter. A flow meter which can directly measure the volume flow rate also can be used.

In the step c of the first aspect according to the invention, the gas-liquid slip factor S and the gas volume flow rate Qg and liquid volume flow rate Ql are calculated based on the following equations:

$$S = 2 - \text{GVF}/(\mu_k \times (\text{GVF} - 1))$$

$$Q_g = Q \times \text{GVF} \times S/(1 - \text{GVF} + S^* \text{GVF})$$

$$Q_l = Q \times (1 - \text{GVF})/(1 - \text{GVF} + S^* \text{GVF})$$

wherein, Q denotes the total volume flow rate measured in step b, the unit being m³/s; S denotes the ratio of the gas velocity (in m/s) to the liquid velocity (in m/s), dimensionless; GVF denotes the gas volume fraction, dimensionless; $\mu_k$ denotes the ratio of the gas viscosity $\mu_g$ to the liquid viscosity $\mu_l$ at the temperature T of the gas-liquid mixed fluid, dimensionless. It can be deemed that the gas viscosity $\mu_g$ and the liquid viscosity $\mu_l$ are physical parameters which can be easily obtained in the invention, and which can be expressed in any viscosity unit, e.g., Pa·s. For example, after the temperature T is measured, based on a conventional gas and liquid composition, the gas viscosity $\mu_g$ and the liquid viscosity $\mu_l$ can be obtained by the means of table lookup and numerical calculation, and alternatively, after the liquid and the gas are separated from each other by any conventional methods, they are measured respectively by a corresponding apparatus, e.g., a viscosity meter.

It is worthy to mention that the gas-liquid slip factor S in the invention can be calculated by a method which is never used in the prior art. The specific calculation is shown as follows:

The present invention sufficiently utilizes the symmetry and the stable state of the gas and liquid annular flow obtained in the circular pipe in the step a, and by combining some characteristics of "Newton Fluid" (fluids in the oil-exploring industry all belong to Newton fluid, and with respect to the concept for the Newton fluid, please see any textbook of hydromechanics), the commonly suitable formula, Navier-Stockes momentum equation which describes a gas-liquid mixed fluid, is simplified, so as to get analytical solutions of the distribution of the gas and liquid velocities in the section of a pipeline. Then, the analytic solutions are integrated relative to respective section domains of the gas and liquid phases to calculate the gas and fluid flow rates. Thereafter, the gas and liquid volume flow rates and the gas and liquid areas are utilized to calculate the true average velocities of the gas and liquid phases in a certain section, and the ratio of the two velocities just is the expression formula of the precise analytic solution of the gas-liquid slip factor S. Concrete deviating procedure is shown as follows:

I. The field analytic solutions of the axis velocity of the gas and liquid phases in the annular flow distributed along the radial direction under the column coordinate system are solved, shown in FIG. 1:

Firstly, the Navier-Stokes equation of the annular flow which flows along a straight circular pipe under the column coordinate system is expressed as follow (only the momentum conservation equation is listed here; with respect to all fluid states and physical parameters, a gas phase or a liquid phase can be distinguished by using the subscripts g or 1; with respect to meanings for other signs, please see the specifications for signs at the last page of the description):

$$\rho \left( \frac{\partial u_r}{\partial t} + u_r \frac{\partial u_r}{\partial r} + \frac{u_\emptyset}{r} \frac{\partial u_r}{\partial \emptyset} + u_z \frac{\partial u_r}{\partial z} - \frac{u_\emptyset^2}{r} \right) = \tag{1}$$

$$-\frac{\partial p}{\partial r} + \mu \left[ \frac{1}{r} \frac{\partial}{\partial r}\left(r \frac{\partial u_r}{\partial r}\right) + \frac{1}{r^2} \frac{\partial^2 u_r}{\partial \emptyset^2} + \frac{\partial^2 u_r}{\partial z^2} - \frac{u_r}{r^2} - \frac{2}{r^2} \frac{\partial u_\emptyset}{\partial \emptyset} \right] + \rho g_r$$

$$\rho \left( \frac{\partial u_\emptyset}{\partial t} + u_r \frac{\partial u_\emptyset}{\partial r} + \frac{u_\emptyset}{r} \frac{\partial u_\emptyset}{\partial \emptyset} + u_z \frac{\partial u_\emptyset}{\partial z} + \frac{u_\emptyset u_r}{r} \right) = \tag{2}$$

$$-\frac{\partial p}{\partial \emptyset} + \mu \left[ \frac{1}{r} \frac{\partial}{\partial r}\left(r \frac{\partial u_\emptyset}{\partial r}\right) + \frac{1}{r^2} \frac{\partial^2 u_\emptyset}{\partial \emptyset^2} + \frac{\partial^2 u_\emptyset}{\partial z^2} - \frac{u_\emptyset}{r^2} + \frac{2}{r^2} \frac{\partial u_r}{\partial \emptyset} \right] + \rho g_\emptyset$$

$$\rho \left( \frac{\partial u_z}{\partial t} + u_r \frac{\partial u_z}{\partial r} + \frac{u_\emptyset}{r} \frac{\partial u_z}{\partial \emptyset} + u_z \frac{\partial u_z}{\partial z} \right) = \tag{3}$$

$$-\frac{\partial p}{\partial z} + \mu \left[ \frac{1}{r} \frac{\partial}{\partial r}\left(r \frac{\partial u_z}{\partial r}\right) + \frac{1}{r^2} \frac{\partial^2 u_z}{\partial \emptyset^2} + \frac{\partial^2 u_z}{\partial z^2} \right] + \rho g_z$$

According to the momentum equations of the gas and liquid phases, symmetry, Newton fluid hypothesis, stable state, absolute heat, continuity at the interfacial of phases, no slip at the pipe wall, and with the weights thereof being neglected, the N-S equation is simplified, and thus the above equations are degenerated into the following ordinary differential equation set; the issue relating to boundary values also can be converted into an issue of the initial value; and the initial conditions and solution domains are degenerated from a nested circular ring to a linear one-dimensional nested interval. The degenerated equations are shown as follows:

$$\frac{d^2 u_{lz}}{dr^2} + \frac{1}{r}\left(\frac{du_{lz}}{dr}\right) = \frac{1}{\mu_l} \frac{dp}{dz} \tag{4}$$

$$r \in [r_0, R]$$

$$\frac{d^2 u_{gz}}{dr^2} + \frac{1}{r}\left(\frac{du_{gz}}{dr}\right) = \frac{1}{\mu_g} \frac{dp}{dz} \tag{5}$$

$$r \in [0, r_0]$$

$$u_{lz}(r) = 0 \mid_{r=R} \tag{6}$$

$$\frac{du_{gz}}{dr} = \frac{du_{lz}}{dr} = 0 \mid_{r=0} \tag{7}$$

$$u_{lz}(r) = u_{gz}(r) = 0 \mid_{r=r_0} \tag{8}$$

The above equation set is solved by integration to obtain the following velocity flow field analytic solutions of the axis velocity distributed along the radial direction under the column coordinate system:

$$u_{lz}(r) = \frac{r^2 - R^2}{4\mu_l} \frac{dp}{dz} \tag{9}$$

$$u_{gz}(r) = \frac{1}{4}\left(\frac{r_0^2 - R^2}{\mu_l} + \frac{r^2 - r_0^2}{\mu_g}\right) \frac{dp}{dz} \tag{10}$$

II. The volume flow rate of the gas and liquid phases are calculated by integrating the velocity flow field values of the gas and liquid phases obtained by the above step, that is, the gas volume flow $Q_g$ and the liquid volume flow $Q_l$ are calculated by respectively integrating $\mu_{lz}$, $\mu_{gz}$ on the corresponding section domains as follows:

$$Q_g = \int_0^{r_0} u_{gz}(r) 2\pi r \, dr = \int_0^{r_0} \frac{1}{4}\left(\frac{r_0^2 - R^2}{\mu_l} + \frac{r^2 - r_0^2}{\mu_g}\right) \frac{dp}{dz} (2\pi r) dr \tag{11}$$

$$= \frac{2\pi}{16}\left[\frac{2(r_0^4 - R^2 r_0^2)}{\mu_l} + \frac{r_0^4}{\mu_g}\right] \frac{dp}{dz}$$

-continued $$Q_l = \int_{r_0}^{R} u_{lz}(r) 2\pi r \, dr = \int_{r_0}^{R} \frac{r^2 - R^2}{4\mu_l} \frac{dp}{dz} (2\pi r) \, dr \qquad (12)$$

$$= \frac{2\pi}{16} \left[ \frac{-R^4 - r_0^4 + 2R^2 r_0^2}{\mu_l} \right] \frac{dp}{dz}$$

III. The analytic formula of the gas to liquid velocity ratio is calculated from the gas and liquid volume flow rate obtained in the above step, and the formula just is the precise analytic solution of the gas-liquid slip factor. Here, two dimensionless parameters are introduced to the annular flow: the ratio of the squared values of the gas column radius to the pipe radius: $k=r_0^2/R^2$, (as above described, the ratio of the squared values of the gas column radius to the pipe radius is equal to the gas volume fraction GVF); and the gas to liquid viscosity ratio at measuring temperature and pressure: $\mu_k=\mu_g/\mu_l$. Furthermore, individual average velocities of gas flow to liquid flow are calculated directed to corresponding sections, and pressure gradient, a part of geometrical factors and other like terms are deleted, so as to obtain the following gas to liquid velocity ratio, i.e., the precise analytic solution of the gas-liquid slip.

In a more general case, in the gas-liquid two-phase annular flow, the gas core portion will more or less carry some liquid drops to form so-called mist flow, while the liquid is still annularly distributed between the gas and the pipe wall, and such fluid mode can be called as an "gas-liquid two-phases annular mist flow". In order to describe the rule of the gas-liquid slip of the gas-liquid two-phases annular mist flow, a variation $\epsilon$ is introduced, and accordingly, the analytic solution of the slip factor S is shown as follows:

$$S = \frac{(1-k)\left(\frac{1}{\mu'_k}\frac{k}{\varepsilon} - 2\left(\frac{k}{\varepsilon} - 1\right)\right)}{\left(1 - \frac{k}{\varepsilon}\right)^2 + (1-\varepsilon)\left(\frac{1}{\mu'_k}\left(\frac{k}{\varepsilon}\right)^2 - 2\left(\left(\frac{k}{\varepsilon}\right)^2 - \frac{k}{\varepsilon}\right)\right)}$$

Wherein $\epsilon \in [k, 1]$, in the case of annular mist flow, k still denotes the gas volume fraction GVF, but now this GVF should be expressed as $GVF=\epsilon^*(r_0^2/R^2)$, $\mu'_k=\epsilon\mu_k-\epsilon+1$. In this equation, when $\epsilon$ approaches k, it indicates that the flow mode is the pure mist flow without any liquid films, there is no gas-liquid slip, i.e., S=1; when $\epsilon$ approaches 1, the formula is degenerated to the aforementioned ideal gas-liquid annular flow model.

IV. The above precise analytic solution of the gas-liquid slip is substituted into the following equations:

$$Q_g = Q^* GVF$$

$$Q_l = Q^*(1-GVF)$$

After necessary simplification and algebraic calculations, the final calculation equations are obtained as follows:

$$S = 2 - GVF/(\mu_k \times (GVF-1))$$

$$Qg = Q \times GVF \times S/(1 - GVF + S^*GVF)$$

$$Q_l = Q \times (1-GVF)/(1 - GVF + S^*GVF)$$

As seen from this, by the method of the first aspect according to the invention, only measuring the total volume flow rate Q, temperature T and gas volume fraction GVF of the gas-liquid mixed fluid, individual volume flow rate of the gas and liquid phases can be precisely measured, and the impacts of the gas-liquid slip are corrected.

In the second aspect according to the invention, the step a is the same as the step a in the first aspect.

In the step b of the second aspect according to the invention, the liquid average velocity $V_l$, temperature T, pressure P and gas volume fraction GVF of the gas-liquid mixed fluid are measured. The measurements to the temperature T, pressure P and gas volume fraction GVF are as those as recited in the step b of the first aspect according to the invention, and relevant details will not be discussed here. The liquid average velocity may be measured by any conventional measurements in the art, for example, by the commonly-used "cross-correlation method" in the art. The basic theory of the method is that two sensors are arranged at the two points which are away from each other in a known distance along the flowing direction of the fluid, and the sensors may be sensors based on microwave, ray, differential pressure or electrical impedance which can be used to measure the density, electrical conductivity or inductance of the fluid. In work, the two sensors measures the time required by the same one signal passing through such known distance, and then the average velocity of the fluid is calculated. The theory of the "cross-correlation method" and the calculation formulae used thereby are known in the prior art, for example, referring to HANDBOOK OF MULTI-PHASE FLOW METERING (published by Norway Oil and Gas Measurement Association, 2005.03, $2^{nd}$ Edition).

In the step c of the second aspect according to the invention, the gas-liquid slip factor S and the gas volume flow rate $Q_g$ and liquid volume flow rate $Q_l$ are calculated based on the following formulae:

$$S = 2 - GVF/(\mu_k \times (GVF-1))$$

$$Qg = Vl \times A \times GVF \times S$$

$$Ql = Vl \times A \times (1-GVF)$$

wherein, $V_l$ denotes the liquid average velocity, the unit being m/s; S denotes the ratio of the gas velocity (in m/s) to the liquid velocity (in m/s), dimensionless; GVF denotes the gas volume fraction, dimensionless; $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless; A denotes the cross-sectional area of the circular pipe, the unit being $m^2$.

In the third aspect according to the invention, the step a is the same as the step a in the first aspect.

In the step b of the third aspect according to the invention, the gas average velocity $V_g$, temperature T, pressure P and gas volume fraction GVF of the gas-liquid mixed fluid are measured. The measurements to the temperature T, pressure P and gas volume fraction GVF are as those as recited in the step b of the first aspect according to the invention, and relevant details will not be discussed here. The gas average velocity may be measured by any conventional measurements in the art, for example, by the commonly-used "cross-correlation method" in the art. The basic theory of the method is that two sensors are arranged at the two points which are away from each other in a known distance along the flowing direction of the fluid, and the sensors may be sensors based on microwave, ray, differential pressure or electrical impedance which can be used to measure the density, electrical conductivity or inductance of the fluid. In work, the two sensors measures the time required by the same one signal passing through such known distance, and then the average velocity of the fluid is calculated. The theory of the "cross-correlation method" and the calculation formulae used thereby are known in the prior art, for example, referring to HANDBOOK OF MULTIPHASE FLOW METERING (published by Norway Oil and Gas Measurement Association, 2005.03, $2^{nd}$ Edition).

In the step c of the third aspect according to the invention, the gas-liquid slip factor S and the gas volume flow rate $Q_g$ and liquid volume flow rate $Q_l$ are calculated based on the following formulae:

$$S = 2 - GVF/(\mu_k \times (GVF-1))$$

$$Qg = Vg \times A \times GVF$$

$$Ql = Vg \times A \times (1-GVF)/S$$

wherein, $V_g$ denotes the gas average velocity, the unit being m/s; S denotes the ratio of the gas velocity (in m/s) and the liquid velocity (in m/s), dimensionless; GVF denotes the gas volume fraction, dimensionless; $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and measuring pressure P of the gas-liquid mixed fluid, dimensionless; A denotes the cross-sectional area of the circular pipe, the unit being $m^2$.

It can be understood that the physical quantities of individual variations in the formulae as mentioned here use international system of units, i.e., SI system of units as far as possible, to assure dimensionless conversions and further to assure no differences on the value of some physical quantities as a ratio of other physical quantities due to the selection for the system of units. However, if desired, any other system of units may be used, e.g., English system of units, and however, all the units should be unified.

EXAMPLES

The following examples are provided for better illustrating the invention and advantages thereof. The examples are illustrative but not limited.

Figure 4:
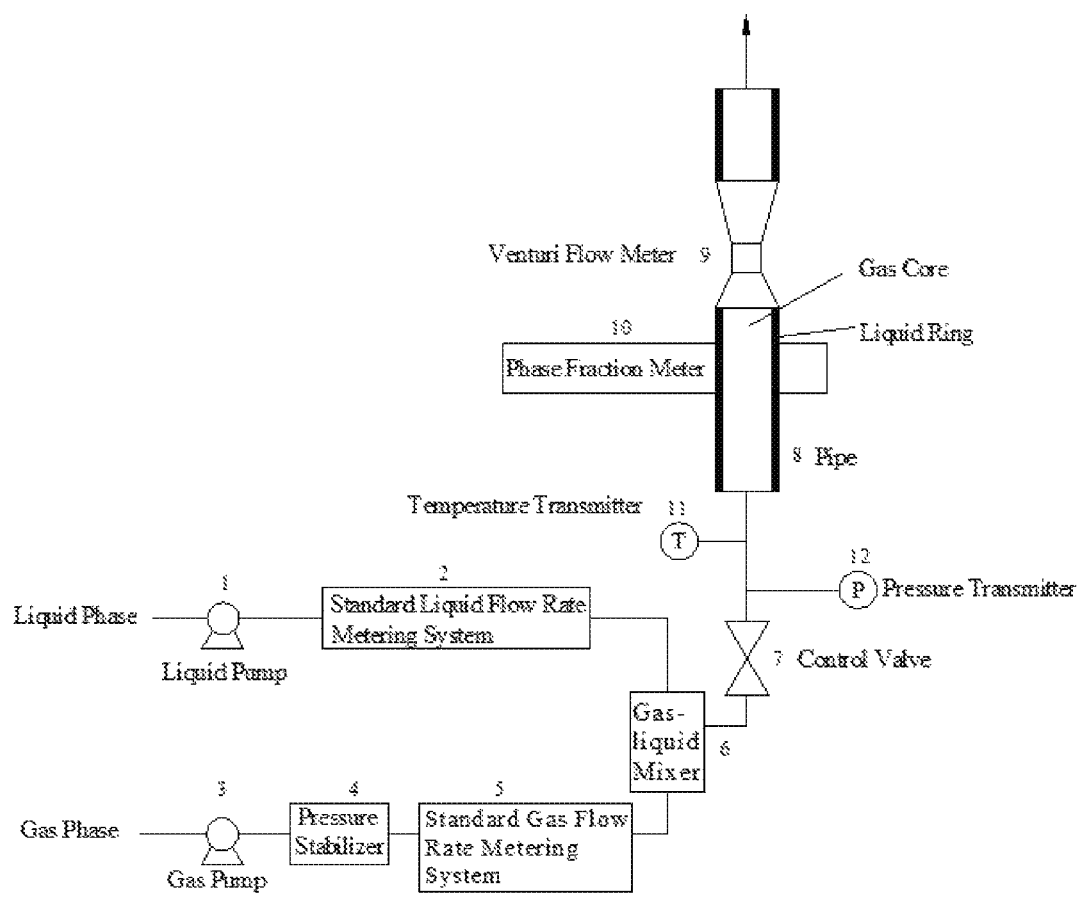
FIG. 4 is a flow scheme for the measuring method used in the examples of the invention.

FIG. 4 is referred to illustrate the examples of the present application. At normal temperature, the liquid pump 1 is used to deliver a certain liquid (e.g., crude oil, water or oil-water mixture) into a gas-liquid mixer 6 via a standard liquid flow rate metering system 2 (for example, a volumetric flow meter for measuring the liquid flow rate), and the volume flow $Q_{liquid}$ of the liquid phase is measured by the standard liquid flow metering system 2. At the same time, a gas pump 3 delivers a certain gas phase (e.g., air, nitrogen gas, natural gas and oilfield associated gas) which is purified and whose pressure is stabilized via a pressure stabilizer 4 to the gas-liquid mixer 6 via a standard gas flow metering system 5 (for example, a speed flow meter for measuring the gas flow rate), and the volume flow $Q_{gas}$ of the gas phase is measured by the standard gas flow metering system 5. The liquid and the gas are sufficiently mixed in the gas-liquid mixer 6 to form a mixture of the gas and liquid phases, and then the mixture flows into the vertical pipeline 8 via the valve 7. According to the measured gas volume flow rate $Q_{gas}$ and the cross-section area A of the pipeline and by combining the opening percentage of the valve, the superficial gas velocity $V_{superficial\ gas}$ in the vertical pipeline 8 is controlled to be >15 m/s, to build a stable-state gas-liquid annular flow in the vertical annular pipe 8.

A venturi flow meter 9 arranged on the vertical circular pipe 8 is used to measure the total volume flow rate Q of the gas-liquid mixed fluid. A phase fraction meter 10 which is arranged at a position cross-sectional to the axis of the vertical pipe 8 is used to measure the gas volume fraction GVF. The temperature meter 11 and the pressure meter 12 are respectively used to measure the temperature T and the pressure P of the mixed fluid. In experiment, the working pressure of the system is less than 2.5 MPa, and the maximum temperatures of the liquid and gas phases do not go beyond 80° C. The precisions of the standard gas and liquid flow metering systems in the experiment are shown in Table 1:

TABLE 1

| | Precision | Type |
|---|---|---|
| Standard liquid flow rate metering system | ±0.2% | Volumetric flow meter |
| Standard gas flow rate metering system | ±1.0% | Velocity flow meter |

The Q, GVF and the cross-section area of the pipeline which are initially measured also can be used to initially calculate the superficial gas velocity by the following formula: $V_{superficial\ gas} = Q \times GVF/A$, and according to whether or not the initial calculating result is greater than 15 m/s, whether or not the stable-state gas-liquid annular flow has been built is judged. The opening degree of the valve may be adjusted to control the superficial gas velocity, so that the critical state for building the above stable-state gas-liquid annular flow is reached.

After the stable-state gas-liquid annular flow is built, with 10 min as the time interval, the above physical parameters are separately measured many times at different time points respectively, to study the repeatable implementations of the method according to the invention. Measuring results are shown in Table 2.

After the temperature T is measured, the viscosity $\mu_g$ of the gas phase and the viscosity $\mu_l$ of the liquid phase are obtained by looking up relevant technical manual respectively, or obtained by thermodynamic calculation of data of physical property. These means are conventional methods, and no details are repeated here.

After the temperature T is measured, the viscosity $\mu_g$ of the gas phase and the viscosity $\mu_l$ of the liquid phase are obtained by looking up relevant technical manual respectively, or obtained by thermodynamic calculation of data of physical property. These means are conventional methods, and no details are repeated here.

Determination of True Value

The above $Q_{liquid}$ and $Q_{gas}$ values measured by the standard flow rate metering systems are deemed as the true values of the liquid and gas volume flow rate. The measuring values $Q_l$ and $Q_g$ obtained by various measuring methods are compared with the true values. According to conventional means in the art, the error of the gas flow rate is expressed by a relative error: $E_g = (Q_g - Q_{gas})/Q_{gas} \times 100\%$; and the error of the liquid flow rate is expressed by an absolute error: $E_l = Q_l - Q_{liquid}$.

Comparative Example

The measurements for individual physical parameters are as above described, and however, when calculating, the impacts of the gas-liquid slip factor are not taken into account, and the gas volume flow rate $Q_g$ and the liquid volume flow rate $Q_l$ are calculated upon each measurement by directly using the following formulae:

$$Q_g = Q \times GVF,$$

Figure 5:
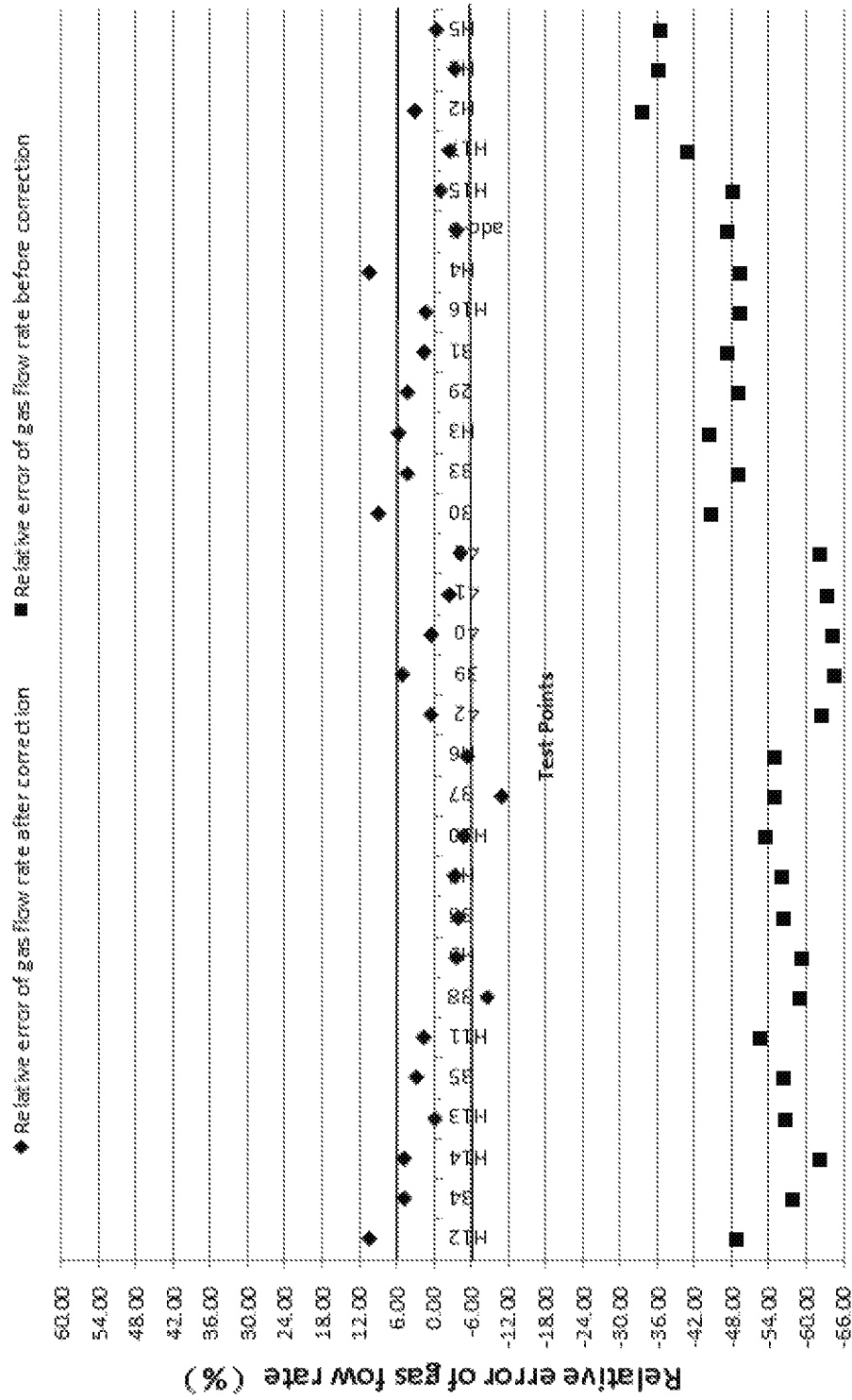
FIG. 5 is a scheme for showing relative error of gas flow rate value corrected by the annular flow model of the invention as compared with true value and relative error of the uncorrected gas flow value as compared with true value.
Figure 6:
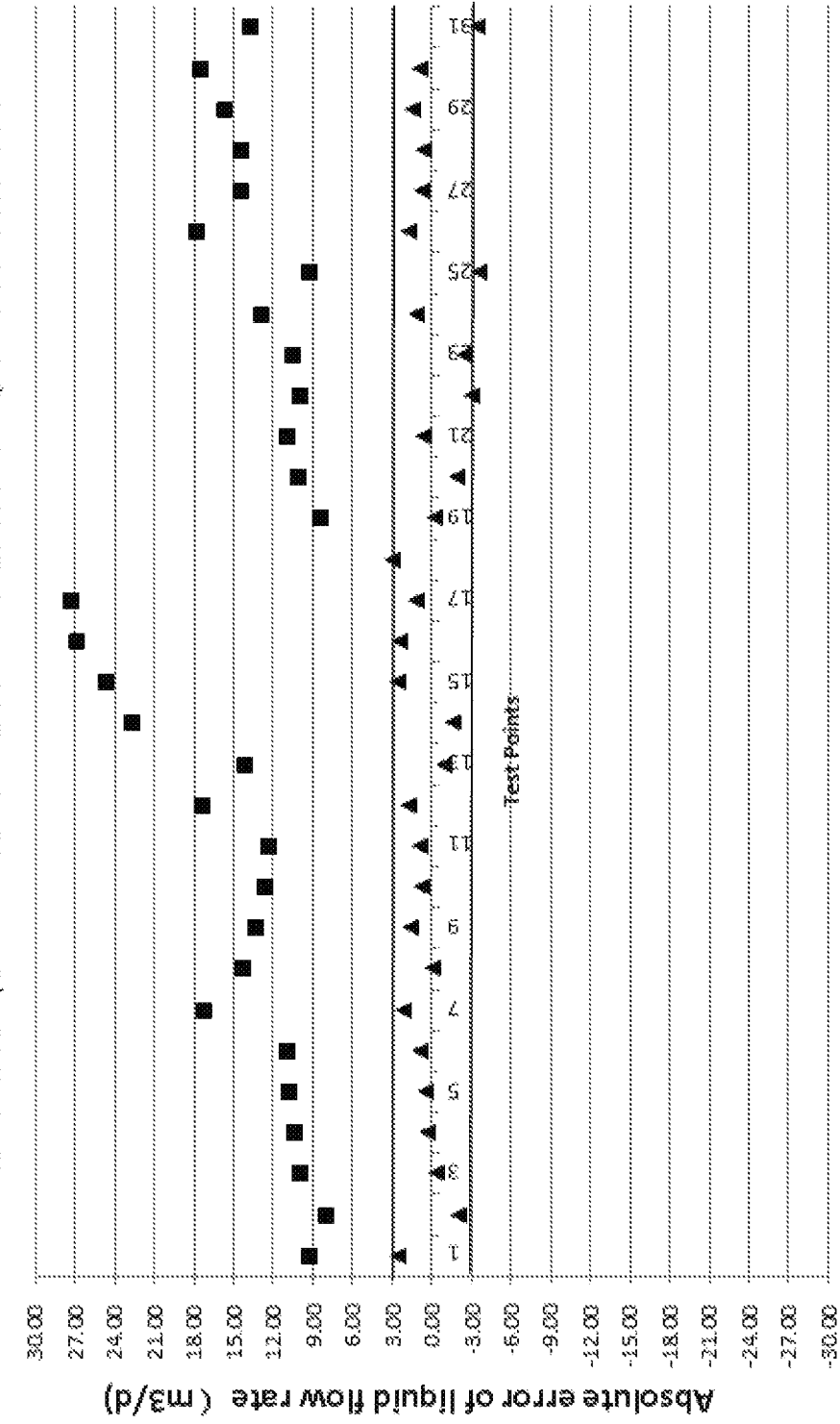
FIG. 6 is a scheme for showing absolute error of liquid flow rate value corrected by the annular flow model of the invention as compared with true value and relative error of the uncorrected liquid flow value as compared with true value.

$Q_l = Q \times (1-GVF)$ $E_l$ and $E_g$ are respectively calculated and listed in Table 2. The schemes are drawn according to the results in Table 2, and the schemes are shown in FIGS. 5 and 6.

Example 1

The measurements for individual physical parameters are as above described, and when calculating, the impacts of the gas-liquid slip factor are taken into account, to calculate the gas volume flow rate Qg and the liquid volume flow rate Ql upon each measurement by using the following formulae:

$S = 2 - GVF/(\mu k \times (GVF-1))$ $Qg = Q \times GVF \times S/(1-GVF+S^*GVF)$ $Ql = Q \times (1-GVF)/(1-GVF+S^*GVF)$ wherein, Q denotes the total volume flow rate, the unit being m³/s; S denotes the ratio of the gas velocity (in m/s) to the liquid velocity (in m/s), dimensionless; GVF denotes the gas volume fraction, dimensionless; $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless.

$E_l$ and $E_g$ are respectively calculated and listed in Table 2. The scheme is drawn according to the results in Table 2, and the scheme is shown in FIGS. 5 and 6.

As seen from the above example and FIGS. 5 and 6, the invention, as compared with conventional techniques, can obtain lower measurement errors for measurement results of gas flow rate and liquid flow rate in a gas-liquid mixed fluid.

It is worthy to point out that the standard gas and liquid flow rate metering systems are not necessary to carry out the method according to the invention, and the examples uses these standard systems only for acquiring the true values of the liquid and gas flow rates, so as to verify the measurement precision of the liquid and gas flow rates measured by the method according to the invention. Accordingly, it is not necessary to carry out the invention by separating the gas and liquid mixture into a separate gas phase and a separate liquid phase. The method according to the invention can directly measure the gas and liquid flow rates which has been a gas-liquid mixture when it is explored from oil wells. Furthermore, as judging the annular flow mode, the $V_{superficial\ gas}$ is initially calculated according to initial measuring results to determine whether or not obtained results are greater than 15 m/s; then, by combining the adjustments to the opening degree of the valve, a trial and error method or an iterative method may be used to judge whether or not an annular fluid is formed in the vertical circular pipe based on the $V_{superficial\ gas}$ of each measurement.

Between the examples of the second and third aspects according to the invention and the examples of the first aspect, the difference only resides in that the methods for measuring the total volume flow rate Q are different, and however, methods used for correcting the slip are completely the same. Hence, no further examples are given for illustrating the examples.

The inventiveness of the invention resides in that: the calculation of a flow mode is simplified by transform the gas-liquid mixed fluid into a gas-liquid annular flow in a vertical circular pipe, and based on the annular flow mode, the analytic solution of the gas-liquid slip factor is first obtained, to make the calculations for the gas and liquid flow rates more precise and the measuring procedure more quick. Furthermore, the method of the invention is applied under wider conditions, and gets rid of strong dependences of conventional flow rate calculations based on empirical models on experimental data and measuring conditions. In more general, the invention further can carry out measurements in the case of an annular mist flow mode, and this further expands the applicable scope of the invention.

The Illustrations To The Signs z: the coordinate along the column center axis in the column coordinate.

r: the radial coordinate in the column coordinate.

Φ: the angular coordinate along the latitude the column coordinate.

ρ: the density of the fluid g: gravity acceleration.

Φ: the angular coordinate along the latitude the column coordinate $\mu_{lz}$: the component of the liquid velocity along z axis, also the component along the pipe axis $\mu_{gz}$: the component of the gas velocity along z axis, also the component along the pipe axis.

$\mu_g$: the gas viscosity $\mu_l$: the liquid viscosity $\mu_k$: $\mu_g/\mu_l$

C1, C2: integral constants to be determined k: $r_0/R$ $Q_g$: the gas flow

Ql: the liquid flow z: the coordinate along the column center axis in the column coordinate.

TABLE 2

| Trial point | Directly measured liquid flow rate Nm³/d | Directly measured gas flow rate Nm³/d | Standard liquid flow rate Nm³/d | Standard gas flow rate Nm³/d | Corrected gas flow rate Nm³/d | Corrected liquid flow rate Nm³/d | Relative error of gas flow rate before the correction % | Absolute error of liquid flow rate before the correction Nm³/d | Relative error of corrected gas flow rate % | Absolute error of corrected liquid flow rate Nm³/d |
|---|---|---|---|---|---|---|---|---|---|---|
| 1 | 20 | 3386 | 12 | 8079 | 8470 | 10 | −58.09 | 7.96 | 4.83 | −2.05 |
| 2 | 20 | 2807 | 11 | 7474 | 7832 | 10 | −62.44 | 9.93 | 4.78 | −0.42 |
| 3 | 21 | 4072 | 10 | 9395 | 9398 | 11 | −56.66 | 10.36 | 0.03 | 0.34 |
| 4 | 22 | 3722 | 11 | 8536 | 8777 | 11 | −56.40 | 10.74 | 2.81 | 0.41 |
| 5 | 20 | 5155 | 9 | 10871 | 11065 | 10 | −52.58 | 10.94 | 1.78 | 0.95 |
| 6 | 28 | 4604 | 10 | 11252 | 10299 | 12 | −59.08 | 17.29 | −8.47 | 2.13 |
| 7 | 26 | 4249 | 11 | 10463 | 10091 | 11 | −59.39 | 14.35 | −3.55 | −0.17 |
| 8 | 23 | 4416 | 10 | 10128 | 9743 | 12 | −56.40 | 13.26 | −3.80 | 1.64 |
| 9 | 22 | 4990 | 9 | 11388 | 11015 | 10 | −56.18 | 12.58 | −3.28 | 0.77 |
| 10 | 23 | 5394 | 11 | 11587 | 11029 | 12 | −53.45 | 12.41 | −4.81 | 0.86 |
| 11 | 29 | 5013 | 14 | 11175 | 10581 | 13 | −55.14 | 14.16 | −5.32 | −0.99 |
| 12 | 47 | 3176 | 25 | 8484 | 8519 | 23 | −62.56 | 22.71 | 0.41 | −1.63 |

TABLE 2-continued

| Trial point | Directly measured liquid flow rate Nm³/d | Directly measured gas flow rate Nm³/d | Standard liquid flow rate Nm³/d | Standard gas flow rate Nm³/d | Corrected gas flow Nm³/d | Corrected liquid flow rate Nm³/d | Relative error of gas flow rate before the correction % | Absolute error of liquid flow rate before the correction Nm³/d | Relative error of corrected gas flow rate % | Absolute error of corrected liquid flow rate Nm³/d |
|---|---|---|---|---|---|---|---|---|---|---|
| 13 | 41 | 2999 | 16 | 8498 | 8936 | 19 | −64.71 | 24.69 | 5.15 | 2.62 |
| 14 | 47 | 2998 | 20 | 8417 | 8449 | 22 | −64.38 | 26.86 | 0.38 | 2.39 |
| 15 | 52 | 3018 | 24 | 8265 | 8066 | 26 | −63.48 | 27.32 | −2.41 | 1.22 |
| 16 | 56 | 3182 | 25 | 8478 | 8116 | 28 | −62.47 | 31.27 | −4.28 | 3.03 |
| 17 | 20 | 3512 | 10 | 6893 | 7190 | 8 | −49.05 | 10.08 | 4.31 | −1.89 |
| 18 | 18 | 4349 | 7 | 7839 | 8299 | 7 | −44.52 | 10.96 | 5.87 | 0.62 |
| 19 | 23 | 3337 | 13 | 6556 | 6835 | 10 | −49.11 | 10.02 | 4.25 | −3.07 |
| 20 | 20 | 4157 | 10 | 7929 | 8051 | 7 | −47.57 | 10.55 | 1.55 | −2.54 |
| 21 | 19 | 3929 | 6 | 7771 | 7874 | 8 | −49.44 | 12.97 | 1.32 | 1.22 |
| 22 | 26 | 5039 | 8 | 9604 | 9249 | 10 | −47.53 | 17.84 | −3.69 | 1.69 |
| 23 | 24 | 4019 | 9 | 7772 | 7692 | 10 | −48.29 | 14.51 | −1.03 | 0.72 |
| 24 | 23 | 6517 | 8 | 11061 | 10799 | 9 | −41.08 | 14.46 | −2.36 | 0.67 |
| 25 | 24 | 7945 | 8 | 11968 | 12344 | 10 | −33.62 | 15.65 | 3.14 | 1.50 |
| 26 | 28 | 8176 | 11 | 12839 | 12423 | 11 | −36.32 | 17.51 | −3.24 | 0.88 |
| 27 | 29 | 7077 | 15 | 11190 | 11157 | 12 | −36.76 | 13.78 | −0.29 | −3.45 |

The invention claimed is:

1. A method for precisely measuring the gas volume flow rate and liquid volume flow rate in a gas-liquid mixed fluid in a vertically arranged circular pipe, the method comprising:
   (a) controlling the gas-liquid mixed fluid to flow through the vertically arranged circular pipe with a superficial gas velocity of greater than 15 m/s so as to form a gas-liquid two-phase annular flow, the gas-liquid two-phase annular flow referring to a flow mode in which the gas surrounds the axis of the circular pipe in a column form, while the liquid is distributed between the gas and the pipe wall in a ring form;
   (b) measuring with a plurality of detectors and meters, the total volume flow rate Q, temperature T, pressure P and gas volume fraction GVF of the gas-liquid mixed fluid;
   (c) determining the gas-liquid slip factor S and the gas volume flow rate Qg and the liquid volume flow rate Ql based on the following equations:

$$S=2-GVF/(\mu_k \times (GVF-1))$$

$$Qg=Q \times GVF \times S/(1-GVF+S^* GVF)$$

$$Ql=Q \times (1-GVF)/(1-GVF+S^* GVF)$$

wherein,
   Q denotes the total volume flow rate, the unit being m³/s;
   S denotes the gas-liquid slip factor expressed as a ratio of the gas velocity (in m/s) to the liquid velocity (in m/s), dimensionless;
   GVF denotes the gas volume fraction, dimensionless;
   $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless the gas-liquid mixed fluid, dimensionless; and
   based on the determining the gas-liquid slip factor S, the gas volume flow rate Qg, and the liquid volume flow rate Ql, adjusting the flow rate of the gas-liquid mixed fluid in the vertically arranged circular pipe to match a predetermined flow rate.

2. A method for precisely measuring the gas volume flow rate and liquid volume flow rate in a gas-liquid mixed fluid in a vertically arranged circular pipe, the method comprising:
   (a) controlling the gas-liquid mixed fluid to flow through the vertically arranged circular pipe with a superficial gas velocity of greater than 15 m/s so as to form a gas-liquid two-phases annular flow, the gas-liquid two-phase annular flow referring to a flow mode in which the gas surrounds the axis of the circular pipe in a column form, while the liquid is distributed between the gas and the pipe wall in a ring form;
   (b) measuring with a plurality of detectors and meters the liquid average velocity Vl, temperature T, pressure P and gas volume fraction GVF of the gas-liquid mixed fluid;
   (c) determining the gas-liquid slip factor S and the gas volume flow rate Qg and the liquid volume flow rate Ql based on the following equations:

$$S=2-GVF/(\mu_k \times (GVF-1))$$

$$Qg=Vl \times A \times GVF \times S$$

$$Ql=Vl \times A \times (1-GVF)$$

wherein,
   $V_l$ denotes the liquid average velocity, the unit being m/s;
   S denotes the gas-liquid slip factor expressed as a ratio of the gas velocity (in m/s) to the liquid velocity (in m/s), dimensionless;
   GVF denotes the gas volume fraction, dimensionless;
   $\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless;
   A denotes the cross-sectional area of the circular pipe, the unit being m²;and
   based on the determining the gas-liquid slip factor S, the gas volume flow rate Qg, and the liquid volume flow rate Ql, adjusting the flow rate of the mixed fluid in the vertically arranged pipe to match a predetermined flow rate.

3. A method for precisely measuring the gas volume flow rate and liquid volume flow rate in a gas-liquid mixed fluid in a vertically arranged circular pipe, the method comprising:
   (a) controlling the gas-liquid mixed fluid to flow through the vertically arranged circular pipe with a superficial gas velocity of greater than 15 m/s so as to form a gas-liquid two-phases annular flow wherein the gas-liquid two-phase annular flow is a flow mode in which the gas surrounds the axis of the circular pipe in a column form while the liquid is distributed between the gas and the pipe wall in a ring form;

(b) measuring with a plurality of detectors and meters the gas average velocity Vg, temperature T, pressure P and gas volume fraction GVF of the gas-liquid mixed fluid;

(c) determining the gas-liquid slip factor S and the gas volume flow rate Qg and the liquid volume flow rate Ql based on the following equations:

$$S = 2 - GVF/(\mu_k \times (GVF-1))$$

$$Qg = Vg \times A \times GVF$$

$$Ql = Vg \times A \times (1-GVF)/S$$

wherein,

Vg denotes the gas average velocity, the unit being m/s;

S denotes the gas-liquid slip factor S expressed as a ratio of the gas velocity (in m/s) to the liquid velocity (in m/s), dimensionless;

GVF denotes the gas volume fraction, dimensionless;

$\mu_k$ denotes the ratio of the gas viscosity $\mu_g$ (in any viscosity unit, e.g., Pa·s) to the liquid viscosity $\mu_l$ (in any viscosity unit, e.g., Pa·s) at the measuring temperature T and pressure P of the gas-liquid mixed fluid, dimensionless;

A denotes the cross-sectional area of the circular pipe, the unit being m²; and based on the determining the gas-liquid slip factor S, the gas volume flow rate Qg, and the liquid volume flow rate Ql, adjusting the flow rate of a mixed fluid in the vertically arranged circular pipe to match predetermined flow rates.

4. The method according to claim 1, wherein a phase fraction meter is used to online measure the gas volume fraction GVF, and said phase fraction meter is selected from a single-energy gamma ray phase fraction meter or a dual-energy gamma ray phase fraction meter.

5. The method according to claim 1, wherein a venturi flow meter, an orifice flow meter or a rotameter is used to measure the total volume flow rate Q.

6. The method according to claim 2, wherein a cross-correlation method is used to measure the liquid average velocity.

7. The method according to claim 3, wherein a cross-correlation method is used to measure the gas average velocity.

* * * * *